(12) United States Patent
Abotabl et al.

(10) Patent No.: US 11,601,921 B2
(45) Date of Patent: Mar. 7, 2023

(54) PARAMETER CONFIGURATION FOR OPPORTUNISTICALLY CONVERTED RESOURCES

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US); Abdelrahman Mohamed Ahmed Mohamed Ibrahim, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 228 days.

(21) Appl. No.: 17/248,448

(22) Filed: Jan. 25, 2021

(65) Prior Publication Data

US 2022/0240236 A1 Jul. 28, 2022

(51) Int. Cl.
*H04W 72/04* (2009.01)
*H04W 72/044* (2023.01)

(52) U.S. Cl.
CPC ..... *H04W 72/0406* (2013.01); *H04W 72/044* (2013.01)

(58) Field of Classification Search
CPC ... H04W 52/04; H04W 72/044; H04W 72/02; H04W 72/0406; H04W 72/14; H04W 72/0453; H04W 74/0833
See application file for complete search history.

(56) References Cited

U.S. PATENT DOCUMENTS

2019/0327757 A1* 10/2019 Oteri ................. H04W 72/0406
2020/0396770 A1* 12/2020 Ohara ............... H04W 74/0833

FOREIGN PATENT DOCUMENTS

WO   WO-2022155634 A1 * 7/2022

OTHER PUBLICATIONS

M. Gharbieh, H. ElSawy, M. Emara, H. -C. Yang and M. -S. Alouini, "Grant-Free Opportunistic Uplink Transmission in Wireless-Powered IoT: A Spatio-Temporal Model," in IEEE Transactions on Communications, vol. 69, No. 2, pp. 991-1006, Feb. 2021, doi: 10.1109/TCOMM.2020.3040210. (Year: 2021).*

* cited by examiner

*Primary Examiner* — Maharishi V Khirodhar
*Assistant Examiner* — Kenneth P Hunt
(74) *Attorney, Agent, or Firm* — Qualcomm Incorporated

(57) ABSTRACT

Various aspects of the present disclosure generally relate to wireless communication. In some aspects, a user equipment (UE) may identify an opportunistic conversion of a particular resource from a downlink resource into an uplink or full-duplex resource. The UE may determine at least one parameter for the particular resource based at least in part on identifying the opportunistic conversion of the particular resource from the downlink resource into the uplink or full-duplex resource, wherein the at least one parameter includes at least one of a power control parameter, a bandwidth part configuration, a configured grant configuration, or a random access configuration. The UE may communicate, using the particular resource, in accordance with the at least one parameter. Numerous other aspects are described.

30 Claims, 12 Drawing Sheets

PARAMETER CONFIGURATION FOR OPPORTUNISTICALLY CONVERTED RESOURCES

FIELD OF THE DISCLOSURE

Aspects of the present disclosure generally relate to wireless communication and to techniques and apparatuses for parameter configuration for opportunistically converted resources.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a user equipment (UE) for wireless communication includes a memory and one or more processors operatively coupled to the memory, the memory and the one or more processors configured to: identify an opportunistic conversion of a particular resource from a downlink resource into an uplink or full-duplex resource; and determine at least one parameter for the particular resource based at least in part on identifying the opportunistic conversion of the particular resource from the downlink resource into the uplink or full-duplex resource, wherein the at least one parameter includes at least one of a power control parameter, a bandwidth part configuration, a configured grant configuration, or a random access configuration; and communicate, using the particular resource, in accordance with the at least one parameter.

In some aspects, a method of wireless communication performed by a UE includes identifying an opportunistic conversion of a particular resource from a downlink resource into an uplink or full-duplex resource; and determining at least one parameter for the particular resource based at least in part on identifying the opportunistic conversion of the particular resource from the downlink resource into the uplink or full-duplex resource, wherein the at least one parameter includes at least one of a power control parameter, a bandwidth part configuration, a configured grant configuration, or a random access configuration; and communicating, using the particular resource, in accordance with the at least one parameter.

In some aspects, a non-transitory computer-readable medium storing a set of instructions for wireless communication includes one or more instructions that, when executed by one or more processors of a UE, cause the UE to: identify an opportunistic conversion of a particular resource from a downlink resource into an uplink or full-duplex resource; and determine at least one parameter for the particular resource based at least in part on identifying the opportunistic conversion of the particular resource from the downlink resource into the uplink or full-duplex resource, wherein the at least one parameter includes at least one of a power control parameter, a bandwidth part configuration, a configured grant configuration, or a random access configuration; and communicate, using the particular resource, in accordance with the at least one parameter.

In some aspects, an apparatus for wireless communication includes means for identifying an opportunistic conversion of a particular resource from a downlink resource into an uplink or full-duplex resource; and means for determining at least one parameter for the particular resource based at least in part on identifying the opportunistic conversion of the particular resource from the downlink resource into the uplink or full-duplex resource, wherein the at least one parameter includes at least one of a power control parameter, a bandwidth part configuration, a configured grant configuration, or a random access configuration; and means for communicating, using the particular resource, in accordance with the at least one parameter.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
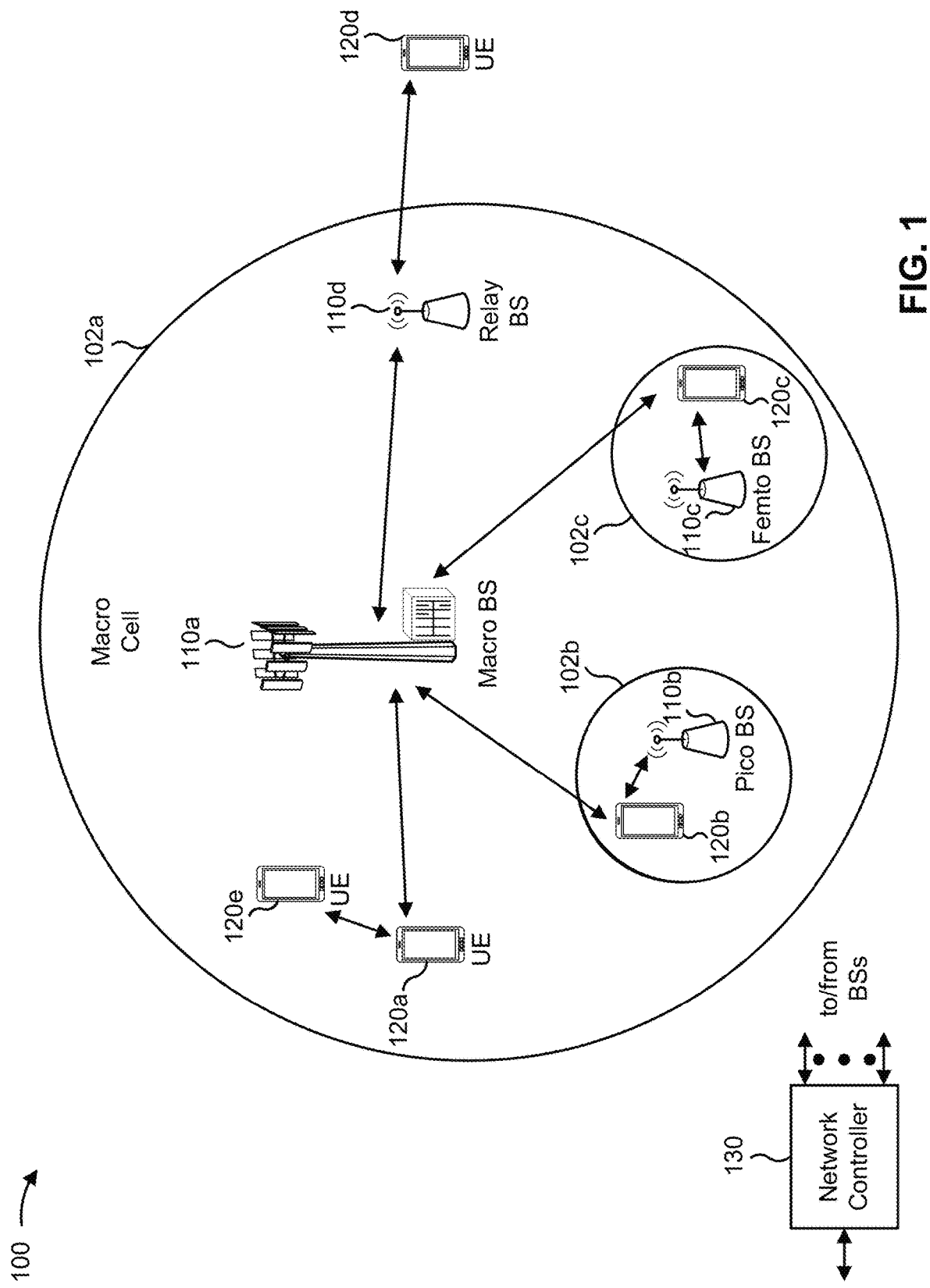
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
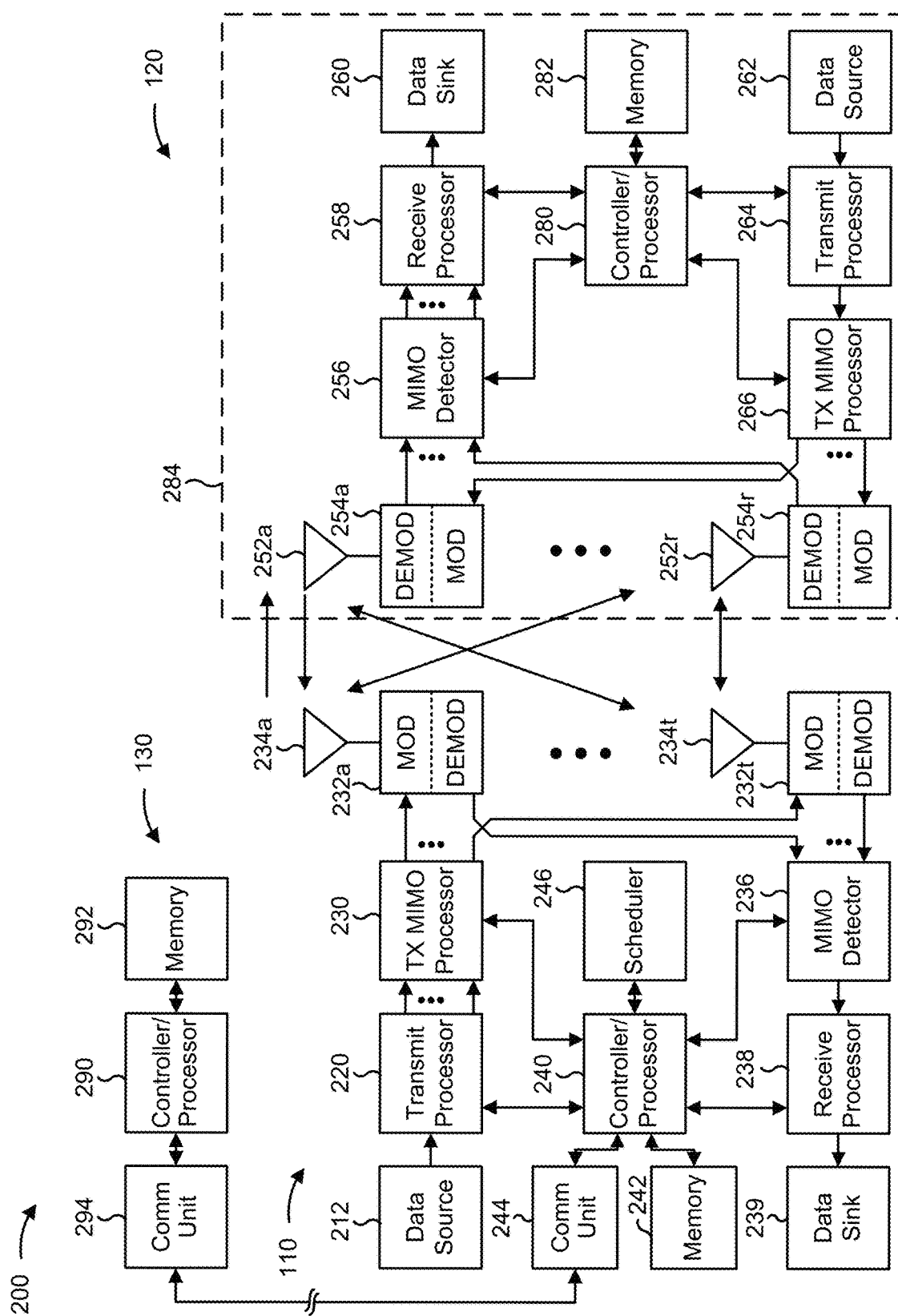
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 9-10.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 9-10.

Controller/processor 240 of base station 110, controller/processor 280 of UE 120, and/or any other component(s) of FIG. 2 may perform one or more techniques associated with parameter control for opportunistically converted resources, as described in more detail elsewhere herein. For example, controller/processor 240 of base station 110, controller/processor 280 of UE 120, and/or any other component(s) of FIG. 2 may perform or direct operations of, for example, process 1000 of FIG. 10 and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1000 of FIG. 10 and/or other processes as described herein. In some aspects, executing instructions may include running the instructions, converting the instructions, compiling the instructions, and/or interpreting the instructions, among other examples.

In some aspects, the UE includes means for identifying an opportunistic conversion of a particular resource from a downlink resource into an uplink or full-duplex resource; means for determining at least one parameter for the particular resource based at least in part on identifying the opportunistic conversion of the particular resource from the downlink resource into the uplink or full-duplex resource, wherein the at least one parameter includes at least one of a power control parameter, a bandwidth part configuration, a configured grant configuration, or a random access configuration; and/or means for communicating, using the particular resource, in accordance with the at least one parameter. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE includes means for receiving a radio resource control indication of an opportunistic offset; and/or means for determining the power control parameter based at least in part on an uplink power control parameter and the opportunistic offset.

In some aspects, the UE includes means for receiving a transmit power control command including indication of an opportunistic offset; and/or means for determining the power control parameter based at least in part on an uplink power control parameter and the opportunistic offset.

In some aspects, the UE includes means for determining the power control parameter based at least in part on a set of stored values for opportunistically converted resources.

In some aspects, the UE includes means for determining the power control parameter based at least in part on a maximum power reduction parameter for opportunistically converted resources.

In some aspects, the UE includes means for determining the power control parameter based at least in part on a power headroom for the particular resource.

In some aspects, the UE includes means for determining an initial power value and a power ramping step size value for a random access procedure; and/or means for performing the random access procedure using the initial power value and the power ramping step size value.

In some aspects, the UE includes means for communicating using a different initial power value or a different power ramping step size value in a different resource that is not an opportunistically converted resource.

In some aspects, the UE includes means for transmitting in accordance with the at least one parameter.

In some aspects, the UE includes means for selecting an active configured opportunistic bandwidth part for use in the particular resource.

In some aspects, the UE includes means for selecting a currently active bandwidth part for use in the particular resource.

In some aspects, the UE includes means for selecting an uplink bandwidth part, from a set of up to a threshold quantity of configured uplink bandwidth parts, for use in the particular resource.

In some aspects, the UE includes means for receiving, in a connected mode or via a system information block message, information identifying a set of physical random access channel preambles for use in an opportunistically converted resource; and/or means for selecting at least one of the set of physical random access channel preambles for use in the particular resource.

In some aspects, the UE includes means for continuing communicating in accordance with the at least one parameter for a non-opportunistically converted uplink resource occurring after the particular resource.

In some aspects, the UE includes means for returning to a default set of parameters that is different from the at least one parameter for a non-opportunistically converted uplink resource occurring after the particular resource; and/or means for communicating in accordance with the default set of parameters in the non-opportunistically converted uplink resource.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
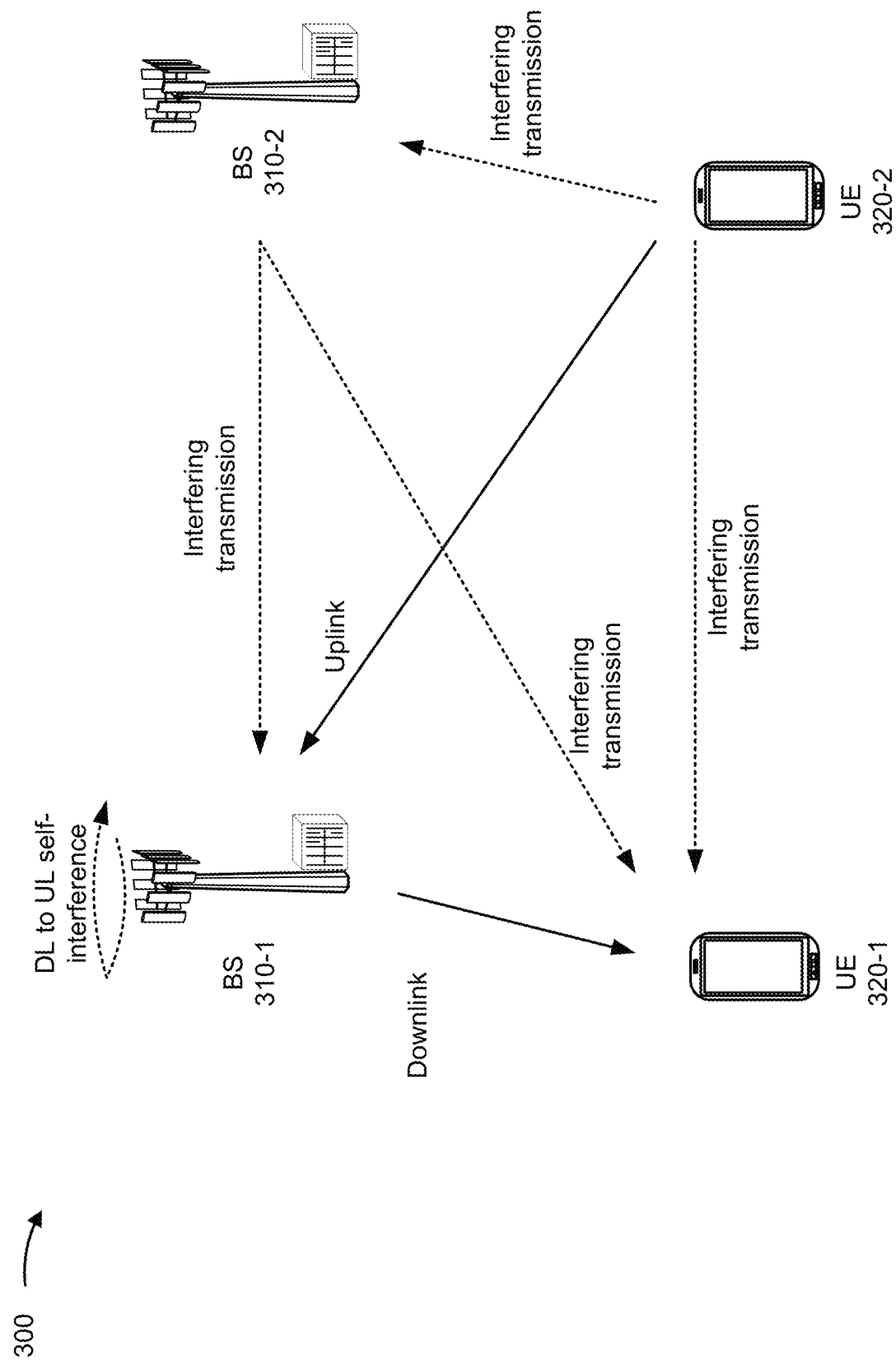
FIGS. 3-5 are diagrams illustrating examples of a wireless network, in accordance with various aspects of the present disclosure.
Figure 4:
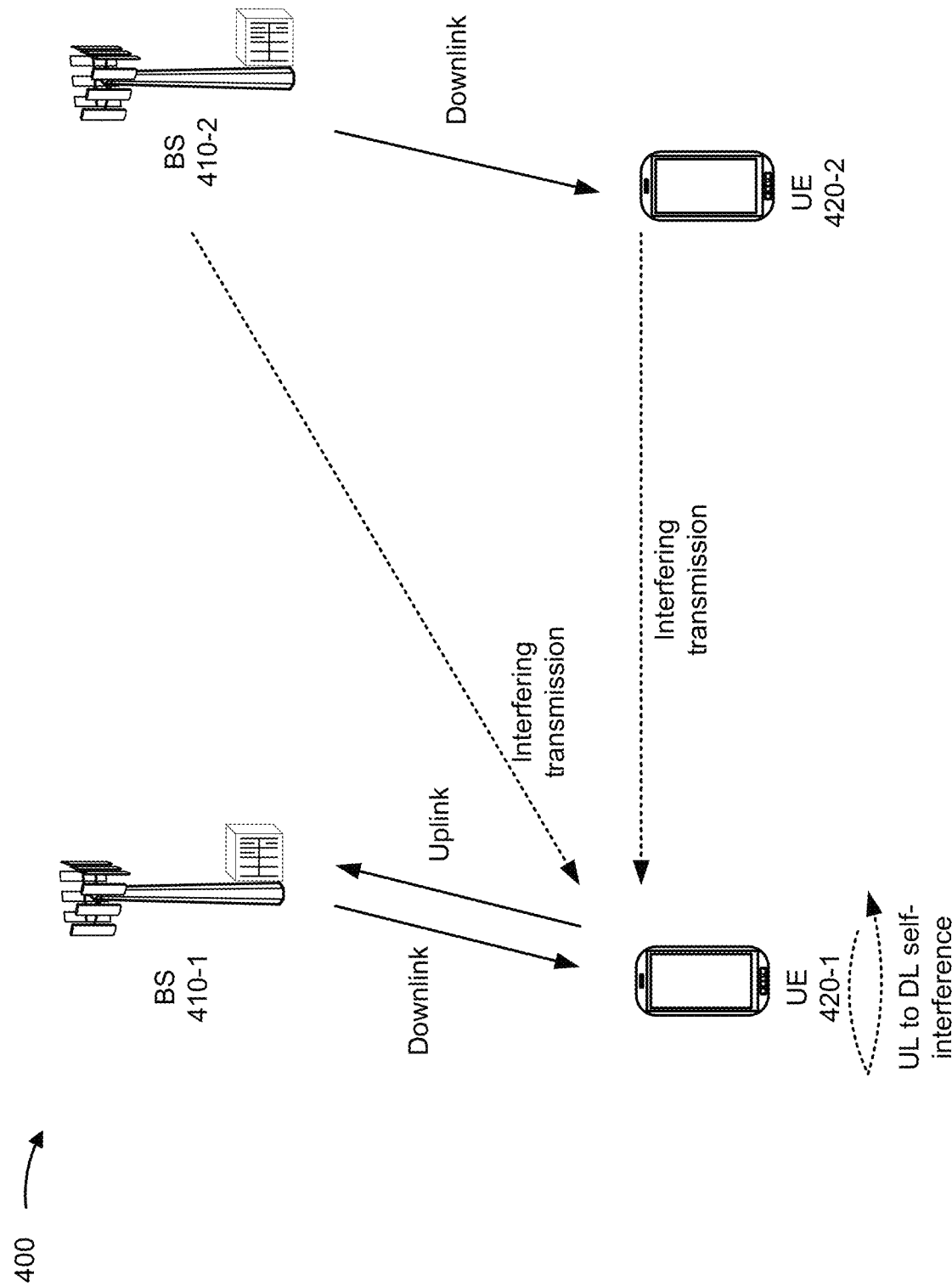
Figure 5:
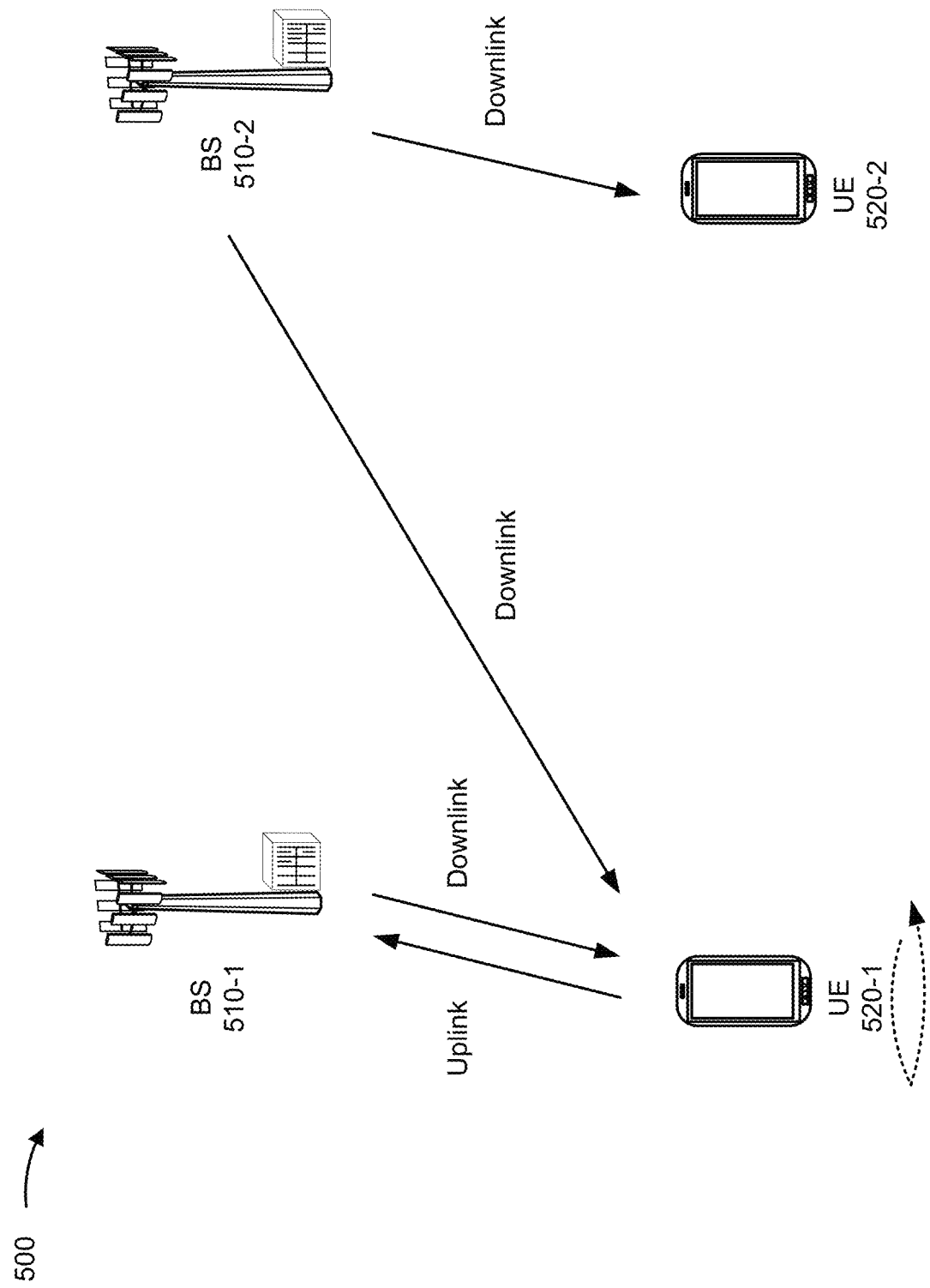

FIGS. 3-5 are diagrams illustrating one or more examples of full-duplex operation modes, in accordance with various aspects of the present disclosure. A UE and a BS may communicate with each other using beams. For example, a beam may be a downlink beam (e.g., on which information may be conveyed from the BS to the UE) or an uplink beam (e.g, on which information may be conveyed from the UE to the BS). In some aspects, the UE and the BS may be integrated access backhaul (IAB) wireless nodes.

A communication link between a UE and a BS may be referred to as half-duplex when the communication link includes only one of an uplink or a downlink or full-duplex when the communication link includes an uplink and a downlink. A full-duplex communication link may provide increased scalability of data rates on the link in comparison to a half-duplex communication link. In a full-duplex communication link, different antenna elements, sub-arrays, or antenna panels of a wireless communication device may simultaneously, concurrently, or contemporaneously perform uplink and downlink communication.

Full-duplex communication may present certain challenges in comparison to half-duplex communication. For example, a wireless communication device (e.g., a UE, a BA, and/or a wireless node) may experience self-interference between an uplink beam and a downlink beam of a full-duplex link or between components of the wireless communication device. This self-interference may complicate the monitoring of reference signals to detect beam failure. Furthermore, self-interference, cross-correlation, and/or the like, may occur in a full-duplex communication link that may not occur in a half-duplex communication link. Additionally, a wireless communication device may experience interfering transmissions from other wireless communication devices (e.g., based at least in part on an angular spread of a beam transmitted by the other wireless communication devices) in the wireless network that may cause a beam failure (e.g., an uplink beam failure or a downlink beam failure).

As shown in FIG. 3, an example wireless network 300 includes a BS 310-1 operating in a full-duplex operation mode. The BS 310-1 may receive an uplink communication from a UE 320-2 and transmit a downlink communication to a UE 320-1. The UE 320-1 and the UE 320-2 may be operating in a half-duplex operation mode. The BS 310-1 may experience downlink to uplink self-interference based at least in part on the downlink communication transmitted to UE 320-1 and the uplink communication received from UE 320-2. Additionally, BS 310-1 may experience interfering transmissions from other wireless communication devices transmitting in the wireless network 300 (e.g., from a BS 310-2). Moreover, UE 320-1 may experience interfering transmissions from other wireless communication devices transmitting in the wireless network 300 (e.g., from the UE 320-2, from the BS 310-2, and/or the like).

As shown in FIG. 4, an example wireless network 400 includes a UE 420-1 operating in a full-duplex operation mode. The UE 420-1 may transmit an uplink communication to a BS 410-1 and may receive a downlink communication from the BS 410-1. The BS 410-1 may be operating in a full-duplex operation mode. The UE 420-1 may experience uplink to downlink self-interference based at least in part on the uplink communication transmitted to the BS 410-1 and the downlink communication received from the BS 410-1. The wireless network 400 may include other wireless communication devices, such as a BS 410-2 and a UE 420-2. The BS 410-2 may transmit a downlink communication to the UE 410-2. The UE 420-1 may experience an interfering transmission based at least in part on transmissions by the BS 410-2 and/or the UE 420-1. For example, the downlink communication transmitted by the BS 410-2 may have an angular spread that may cause an interfering transmission to be received by the UE 420-1. Similarly, an uplink communication transmitted by the UE 420-2 may have an angular spread that may cause an interfering transmission to be received by the UE 420-1.

As shown in FIG. 5, an example wireless network 500 includes a UE 520-1 operating in a full-duplex operation mode. The UE 520-1 may transmit an uplink to a BS 510-1 and may receive a downlink from a BS 510-2. The UE 520-1 may include a multi transmission and reception (multi-TRP) architecture. The UE 520-1 may experience uplink to downlink self-interference based at least in part on the uplink transmitted to the BS 510-1 and the downlink received from the BS 510-2. The BS 510-1 and the BS 510-2 may be operating in a half-duplex mode of operation. The BS 510-2 may transmit a downlink to a UE 520-2. In some aspects, the UE 520-1 may experience one or more interfering transmissions based at least in part on the transmissions of BS 510-1, BS 510-2, and/or UE 520-2.

As indicated above, FIGS. 3-5 are provided as examples. Other examples may differ from what is described with respect to FIGS. 3-5.

Figure 6:
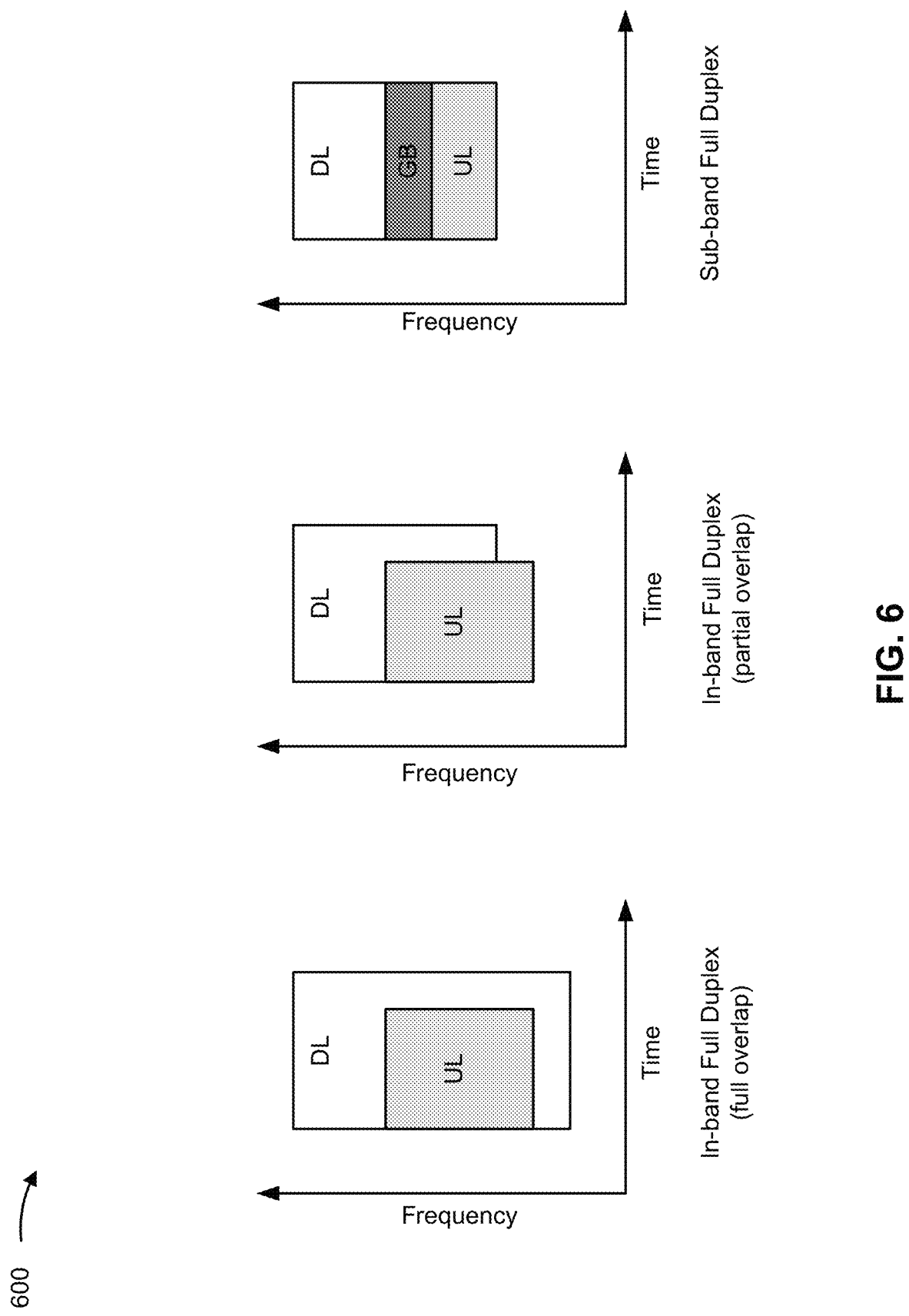
FIG. 6 is a diagram illustrating an example of full-duplex types, in accordance with various aspects of the present disclosure.

FIG. 6 is a diagram illustrating one or more examples 600 of full-duplex types, in accordance with various aspects of the present disclosure. As described above, full-duplex operation may involve communications having both an uplink (UL) and a downlink (DL) at the same time (e.g., transmit and receive at the same time). The uplink and downlink may share resources (e.g., time resources and/or frequency resources) associated with the communications.

As shown in FIG. 6, a full-duplex communication may be an in-band full duplex (IBFD) mode (e.g., a mode that includes an uplink and a downlink that share the same time resources and/or frequency resources). In some aspects, an IBFD mode may be a full overlap IBFD mode, such that the downlink resources completely overlap the uplink resources (e.g., all of the uplink resources are shared with the downlink resources). In some aspects, a full overlap IBFD mode may have uplink resources that completely overlap the downlink resources. In some aspects, an IBFD communication may be a partial overlap IBFD mode, such that the downlink resources do not completely overlap the uplink resources (e.g., only some of the uplink resources are shared with the downlink resources).

In some aspects, a full-duplex mode may be a sub-band frequency division duplex (FDD) mode (e.g., a mode that includes an uplink and a downlink that share the same time resources, and use different frequency resources). In some aspects, the resources associated with the downlink and the resources associated with the uplink may be separated in the frequency domain by a guard band (GB) (e.g., a range of frequencies that are not allocated to the uplink or the downlink).

As indicated above, FIG. 6 is provided as an example. Other examples may differ from what is described with respect to FIG. 6.

Figure 7:
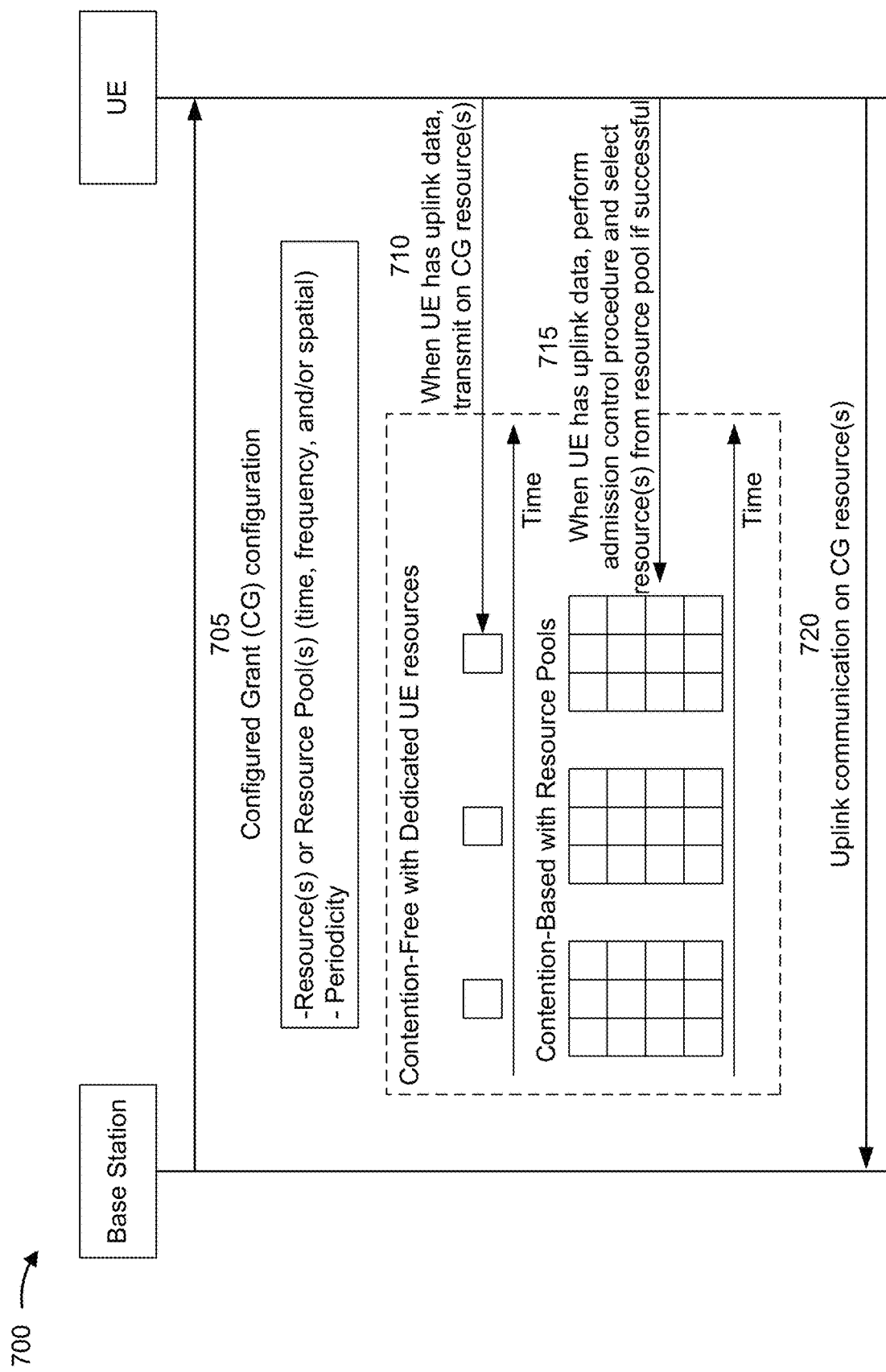
FIG. 7 is a diagram illustrating an example of configured grant (CG) communication, in accordance with various aspects of the present disclosure.

FIG. 7 is a diagram illustrating an example 700 of configured grant (CG) communication, in accordance with various aspects of the present disclosure. As shown, example 700 includes a BS and a UE.

As shown in FIG. 7, and by reference number 705, the BS may transmit a CG configuration to the UE. For example, the BS may transmit configuration information (e.g., in a radio resource configuration (RRC) message, in a downlink control information message, and/or in another signaling message) that identifies the CG. In some aspects, the configuration information identifying the CG may indicate a resource allocation (e.g., in a time domain, frequency domain, spatial domain, and/or code domain) and/or a periodicity associated with the resource allocation. The CG may identify a resource or set of resources available to the UE for transmission of an uplink communication (e.g., data and/or control information). For example, the CG configuration may identify a resource allocation for a physical uplink shared channel (PUSCH). In some aspects, the CG configuration may identify a resource pool or multiple resource pools that may be available to the UE for an uplink transmission.

In some aspects, the CG configuration may configure contention-free CG communication with resources dedicated for the UE to transmit uplink communications. In this case, the CG configuration may indicate a resource allocation (e.g., in a time domain, frequency domain, spatial domain, and/or code domain) dedicated for the UE to use to transmit uplink communications. In some aspects, the CG configuration may including a configuration for the resource allocation for the UE to occur periodically, such that the resource allocation corresponds to periodically occurring transmission time occasions. As shown in FIG. 7, and by reference number 710, when the UE has uplink data to transmit, the UE transmits the uplink data in the CG resources identified by the CG configuration. For example, the UE transmits the uplink data in one of the CG uplink occasions identified in the CG configuration using the configured resource allocation.

A CG configuration with regular periodic CG uplink occasions with a dedicated resource allocation for the UE may be convenient for a UE with periodic uplink traffic (e.g., with trivial jitter). The CG configuration may configure the periodicity associated with the resource allocation to associate CG uplink occasions with periodic nominal arrival times at which traffic to be transmitted to the BS is expected to arrive at (or be ready to be transmitted by) the UE. However, the actual arrival times at which the traffic arrives (or is ready to be transmitted) by the UE may be different than the nominal arrival times, and this difference in times is known as jitter. In some aspects, traffic jittering may be handled by configuring multiple CGs around the nominal arrival times. In some aspects, multiple opportunities for the UE to transmit the uplink communication may be defined within a CG uplink occasion. The UE may be configured with multiple CG uplinks to allow the UE to repeatedly transmit the CG uplink communications and increase the likelihood that the BS receives the communications. NR CG uplink may depend on dynamic grant re-transmission. In some aspects, to suppress a quantity of dynamic grants, the CG can be configured with blind re-transmissions via multiple repetitions per occasion.

In some cases, CG configurations with dedicated resources allocated per UE may be inefficient. For example, CG configurations with dedicated UE resources for a large number of UEs may result in consumption of an excessive amount of PUSCH resources. In this case, a considerable portion of the PUSCH resources may be inefficiently utilized, which reduces system capacity. For example, when multiple CG configurations for a UE are used for de-jittering, only a subset of CG resources may be effectively utilized. In another example, when multiple transmission opportunities are defined per CG uplink occasion, only one opportunity may be effectively utilized. In yet another example, when a blind repetition scheme is used for re-transmissions, a packet may have been already decoded after the first one or more repetitions (early decoding) such that a remainder of the repetitions are unnecessary. Unlike a downlink case, this type of inefficient consumption of system resources cannot be addressed by scheduling, as the BS does not know exactly when traffic will arrive at the UEs.

In some aspects, statistical multiplexing schemes may be used to allocate CG uplink resource access among multiple UEs. Statistical multiplexing of CG uplink communications from multiple UEs may be useful in cases in which there are a high number of UEs associated with somewhat random traffic arrivals at the BS and/or cases in which a traffic arrival density for traffic arriving at the UEs is time varying. For example, statistical multiplexing of CG uplink communications from multiple UEs may be useful for a network deployment, such as an industrial wireless sensor network, with a large capacity of UEs. In such cases, the uplink traffic associated with at least a group of UEs may be delay insensitive.

As shown in FIG. 7, the CG configuration may configure contention-based CG communication with resource pools that are available for multiple UEs to use to transmit uplink communications. The contention-based CG configuration uses statistical multiplexing to share the resource pools among multiple UEs. A resource pool includes multiple resources (e.g., in a time domain, frequency domain, spatial domain, and/or code domain) that can be allocated for uplink transmission for one or more UEs. For example, an x-axis of an illustrated resource pool may indicate transmission times and ay-axis of the illustrated resource pool may indicate resources (e.g., frequency domain, spatial domain, and/or code domain) that can be allocated at each transmission time. In some aspects, the same resource pools may be configured for multiple UEs.

Statistical multiplexing schemes may involve spreading control and overloading control. For example, spreading relates to distributing traffic (as interference to others) into a resource pool. In a specific example, direct spreading CDMA may be utilized in legacy 3G systems. NR systems which rely on an OFDMA network may utilize organized randomized resource selection, in which the BS can identify sources that contribute to collisions in a resource pool and/or local overloading of a resource pool.

Overloading control relates to controlling a level of multiplexing within a stable region. For example, overly aggressive multiplexing may result in an unusable resource pool. Rise over thermal (RoT) based control (in addition to power control) may be utilized in legacy 3G systems. In 3GPP, a central scheduler may be used to assign grants to respective UEs. In 3GPP2, a hybrid approach may be used in which an access network sends a reverse link activity bit to guide autonomous rate selection at respective UEs. Channel busy ratio (CBR) based control may be utilized in NR sidelink. For example, each sidelink UE may autonomously measure CBR and regulate its channel use based at least in part on the measured CBR.

As further shown in FIG. 7, and by reference number 715, for the contention-based CG configuration, when the UE has uplink data to be transmitted, the UE performs an admission control procedure and selects one or more resources from the resource pool if the admission control procedure is successful. In some aspects, the admission control procedure may include the UE selecting a random number (e.g., between 0 and 1 or some other range), comparing the random number and a threshold, and determining whether the random number satisfies the threshold. If the random number satisfies the threshold, then the admission is successful and the UE selects a resource from the resource pool to transmit the uplink communication.

In some aspects, the BS may control the probability of the UE accessing the resource pool by setting and/or adjusting the threshold. For example, the BS may dynamically adjust the threshold to permit more or fewer UEs to access the resource pool in order to prevent resource collisions. Additionally, or alternatively, the BS may assign different thresholds to be used by different UEs.

Based at least in part on the UE determining that the random number satisfies the threshold, the UE may select a resource from the resource pool to transmit the uplink communication. The UE may select the resource from the resource pool using randomized and/or pseudo-randomized resource selection. For example, the UE may use a hashing function based at least in part on a UE identifier, time, and/or resource pool index to select the resource from the resource pool.

As further shown in FIG. 7, and by reference number 720, the UE transmits the uplink communication to the BS on the CG resource. For example, the UE may transmit the uplink communication as a PUSCH communication using a resource allocation identified by the CG.

As indicated above, FIG. 7 is provided as an example. Other examples may differ from what is described with respect to FIG. 7.

Figure 8A:
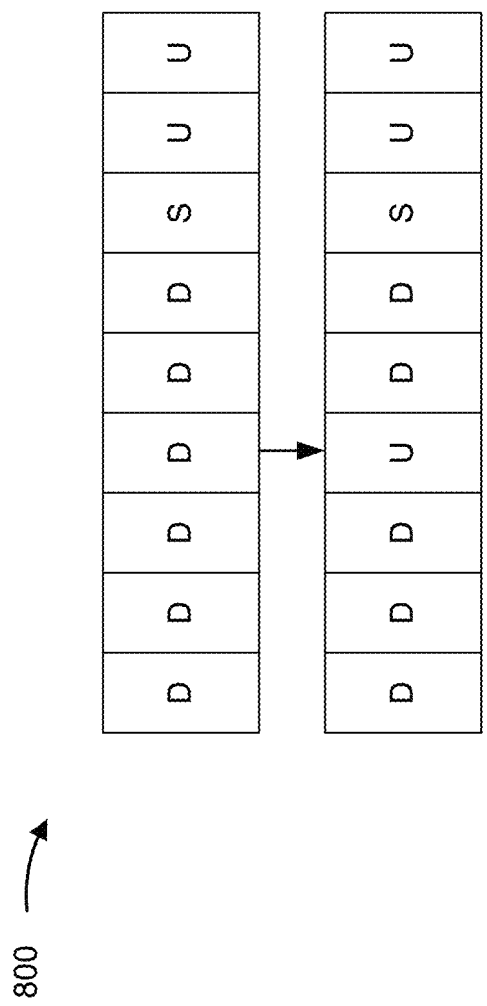
FIGS. 8A and 8B are diagrams illustrating examples of opportunistic conversion of a communication resource, in accordance with various aspects of the present disclosure.
Figure 8B:
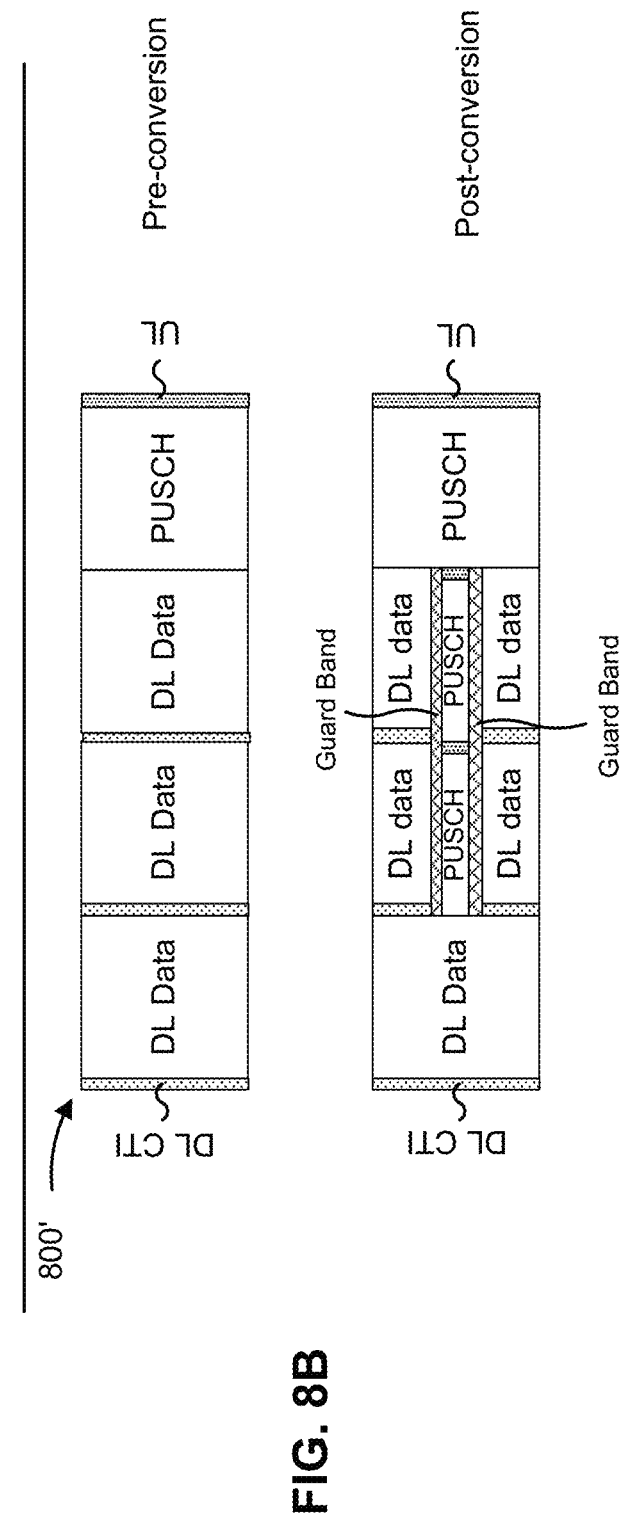

FIGS. 8A and 8B are diagrams illustrating examples 800/800' of opportunistic conversion of a communication resource, in accordance with various aspects of the present disclosure.

As shown in FIG. 8A, a BS may assign, for its own cell, a set of slots as downlink (D) slots, uplink (U) slots, or gap slots (S) for switching between downlink and uplink. In some other examples, one or more slots may be assigned as flexible slots in which either uplink or downlink communication may occur. For a BS to receive uplink with a threshold level of reliability (e.g., as may be required for ultra-reliable low-latency communications (URLLC)), the BS may use a dedicated uplink slot; however, a dedicated uplink slot may result in a relatively high latency. Similarly, the BS may receive in uplink slots on which other BSs of other operators may be transmitting (e.g., a cross-border scenario); however, using uplink slots on which other BSs are transmitting may result in interference, which may reduce a reliability of communications.

As a result, the BS may opportunistically identify a downlink slot to convert to an uplink slot, as shown, thereby enabling reception of data or control information from a UE with a threshold level of reliability. For example, the BS may perform sensing on a channel using a subset of antennas of the BS (or using a secondary panel of the BS). When the BS detects less than a threshold level of jamming (e.g., from other operators operating on the channel or from the BS operating on an adjacent channel and self-jamming), the BS may determine to opportunistically convert a slot on the channel. In this case, the BS may determine that a slot is appropriate for opportunistic conversion based at least in part on an uplink signal to interference and noise (SINR) ratio or an uplink reference signal received power (RSRP), among other examples.

The BS may convert a downlink slot into, for example, a sub-band full duplex (SBFD) slot (as shown in FIG. 8B) or an in-band full duplex (IBFD) slot and may transmit, for example, a group common system information message to a set of UEs to indicate a new slot pattern (e.g., where an uplink channel is included in at least one sub-band of one or more slots that were assigned for downlink communication). Similarly, the BS may transmit indications to one or more other operators (e.g., via an inter-gNB link) to identify the change to the slot format, thereby reducing a likelihood of interference on the opportunistically converted slot. Although some examples are described in terms of a slot, opportunistic conversion of other types of resources may be possible, such as a symbol, a group of symbols, or a group of slots, among other examples.

As indicated above, FIGS. 8A and 8B are provided as an example. Other examples may differ from what is described with respect to FIGS. 8A and 8B.

As described above, a BS may opportunistically convert a resource, such as a slot or a symbol, from a downlink resource to an uplink resource or a full-duplex resource. When transmitting on the opportunistically converted resource, a UE may transmit using a power determined based at least in part on a power control procedure for an uplink resource or full-duplex resource depending on a type to which the downlink resource is opportunistically converted. Similarly, the UE may use a bandwidth part (BWP) configuration, an uplink configured grant (UL-CG) configuration, or a random access configuration, among other examples, that is selected for use with uplink resources or full-duplex resources. However, an interference condition on an opportunistically converted resource may be different from an interference condition on a non-converted equivalent resource. In other words, interference on a resource that is opportunistically converted to an uplink resource may be different than interference on a resource that was originally assigned as an uplink resource (and not opportunistically converted).

Some aspects described herein enable parameter control for opportunistically converted resources. For example, a UE may determine that a resource, on which the UE is to transmit, is an opportunistically converted resource and may determine at least one parameter for communication on the resource based at least in part on the resource being an opportunistically converted resource. In this case, the at least one parameter may include a transmission power, a bandwidth part, a configuration for UL-CG transmission, or a physical random access channel (PRACH) configuration, among other examples. In this way, the UE may adapt communication to, for example, an interference condition associated with an opportunistically converted resource, thereby improving communication performance.

Figure 9:
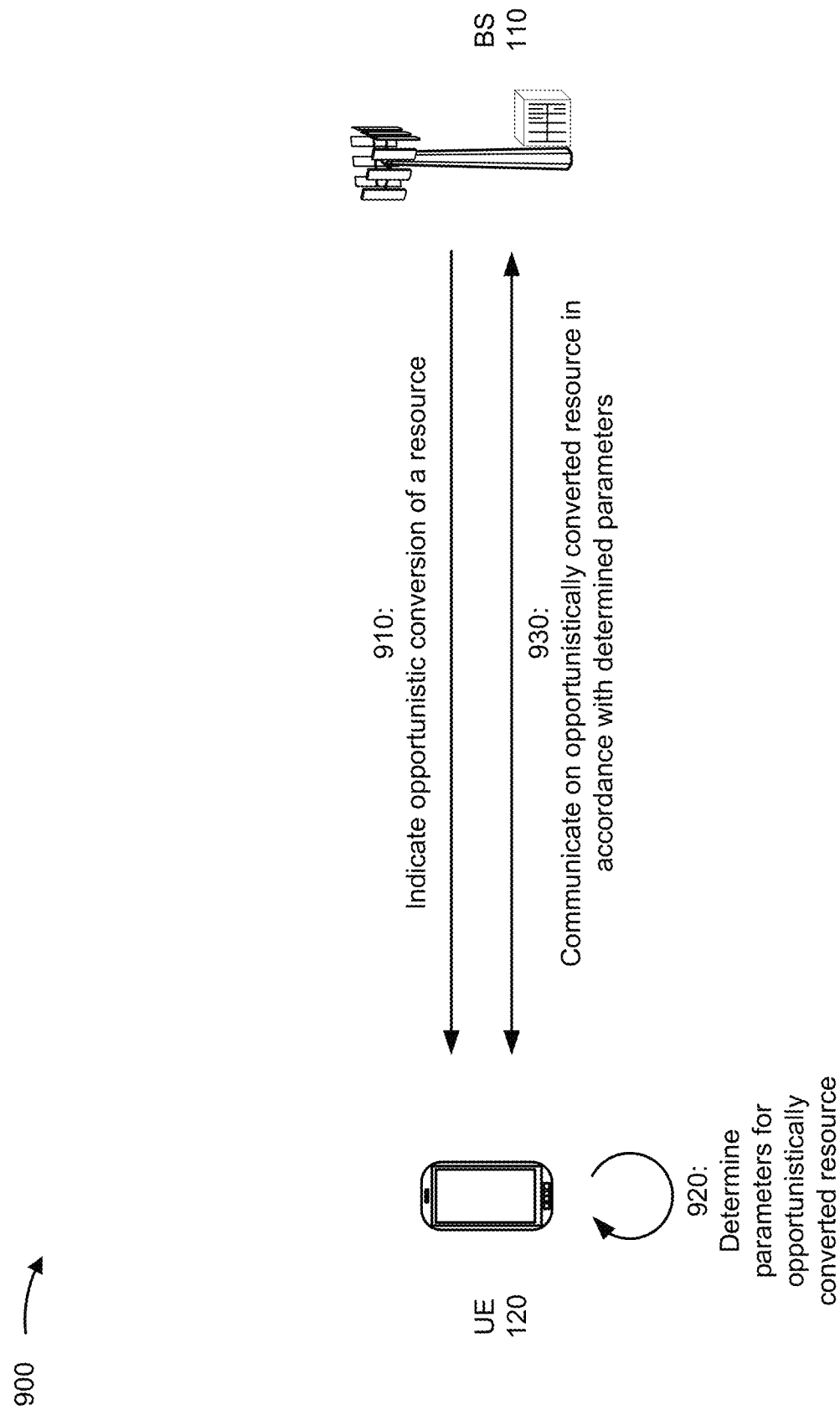
FIG. 9 is a diagram illustrating an example associated with parameter control for opportunistically converted resources, in accordance with various aspects of the present disclosure.

FIG. 9 is a diagram illustrating an example 900 associated with parameter control for opportunistically converted resources, in accordance with various aspects of the present disclosure. As shown in FIG. 9, example 900 includes communication between a BS 110 and a UE 120. In some aspects, BS 110 and UE 120 may be included in a wireless network, such as wireless network 100. BS 110 and UE 120 may communicate via a wireless access link, which may include an uplink and a downlink.

As further shown in FIG. 9, and by reference number 910, UE 120 may receive information indicating an opportunistic conversion of a resource. For example, BS 110 may determine to opportunistically convert a resource and may transmit an indication to UE 120 to identify the opportunistically converted resource. In some aspects, BS 110 may transmit control information to UE 120 to identify the opportunistically converted resource. For example, based at least in part on identifying a resource that is appropriate for opportunistic conversion (e.g., a resource with less than a threshold level of jamming from other operators on a co-channel or from self-jamming on an adjacent channel), BS 110 may transmit a group common system frame indicator to UE 120 to identify a new resource pattern that includes the resource being opportunistically converted to a different type of resource. In this case, UE 120 may identify the resource as being opportunistically converted from a downlink resource (e.g., a downlink symbol or slot) to an uplink resource (e.g., an uplink symbol or slot) or a full-duplex resource (e.g., a full-duplex symbol or slot).

As further shown in FIG. 9, and by reference number 920, UE 120 may determine one or more parameters for the opportunistically converted resource. For example, based at least in part on identifying the opportunistically converted resource, UE 120 may determine one or more parameters to use for communication on the opportunistically converted resource. In some aspects, UE 120 may determine a power control parameter for the opportunistically converted resource. For example, at a first time, UE 120 may receive radio resource control (RRC) signaling identifying an opportunistic offset and may, at a second time when an opportunistically converted resource is identified, apply the opportunistic offset to a current uplink power control parameter.

Additionally, or alternatively, UE 120 may receive a transmit power control (TPC) command that includes one or more bits identifying an opportunistic offset to apply to opportunistically converted resources. Additionally, or alternatively, UE 120 may determine the opportunistic offset or power control derived therefrom based at least in part on a maximum power reduction (MPR) value. For example, UE 120 may be configured with an MPR table that includes a column with values for use in opportunistically converted resources. Additionally, or alternatively, UE 120 may report a power headroom (PHR) for an opportunistically converted resource to cause power control to account for the opportunistic conversion of the resource. For example, UE 120 may apply an opportunistic offset to a PHR value that is reported to BS 110 to cause BS 110 to control a power for UE 120 in connection with the opportunistic offset.

Based at least in part on applying the opportunistic offset to the current uplink power control parameter, UE 120 may determine an opportunistically converted resource-specific uplink power control parameter to use for communication on an uplink on the opportunistically converted resource. In some aspects, the opportunistic offset may be particular to a type of the opportunistically converted resource. For example, UE 120 may use a first opportunistic offset for a resource converted to a half-duplex (e.g., uplink) resource and a second opportunistic offset for a resource converted to a full-duplex resource. Additionally, or alternatively, UE 120 may determine the opportunistic offset based at least in part on whether the resource is opportunistically converted for cross-border optimization or for dynamic time division duplexing (TDD) operation (which may be determined based at least in part on signaling received from BS 110). In some aspects, UE 120 may determine the uplink power control parameter (e.g., the opportunistically converted resource-specific uplink power control parameter) based at least in part on an equation of the form:

$$P_{PUSCH}(j,q,l)=\min\{P_{CMAX}, P_{O\_PUSCH}(j)+10\cdot\log_{10}(2^{\mu}\cdot M_{RB}^{PUSCH})+\alpha(j)\cdot PL(q)+\Delta_{TF}+f(l)+\text{opportunistic\_offset}\}$$

where opportunistic_offset represents the opportunistic offset to apply, and a remainder of the equation represents a power control equation applied to all resources regardless of whether an opportunistic conversion has occurred. Additionally, or alternatively, UE 120 may adjust one or more parameters of the equation for power control to account for the opportunistic offset, such as by replacing the parameter $\alpha(j)$ with a parameter $\alpha\_opportunistic(j)$ specific to opportunistically converted resources. Although some aspects are described in terms of a particular change to a particular parameter, other parameter changes may be possible for power control.

In some aspects, UE 120 may determine a random access parameter for the opportunistically converted resource based at least in part on identifying the opportunistically converted resource. For example, UE 120 may configure a random access channel (RACH) procedure for the opportunistically converted resource such that UE 120 uses an initial power value or power ramping step size selected based at least in part on the resource being an opportunistically converted resource. In this case, at a later time when UE 120 returns to a non-opportunistically converted resource (a "normal resource"), UE 120 may return to using default parameters ("normal parameters"), such as a default initial power value or a default power ramping step size, corresponding to the normal resource. Alternatively, UE 120 may continue using a configuration selected for an opportunistically converted resource after the opportunistically converted resource rather than returning to normal parameters.

Additionally, or alternatively, UE 120 may select a physical random access channel (PRACH) preamble based at least in part on identifying the opportunistically converted resource. In this case, BS 110 may provide information identifying one or more PRACH preambles for use with an opportunistically converted resource in a connected mode communication or in a system information block (SIB) broadcast. Additionally, or alternatively, UE 120 may select a configuration for a RACH message type 1 (msg1) based at least in part on identifying the opportunistically converted resource. For example, UE 120 may select a target power or power ramping step size for msg1 when msg1 is to be communicated in the opportunistically converted resource. In this way, UE 120 may account for cross-border interference or dynamic TDD interference, among other examples, in an opportunistically converted resource.

In some aspects, UE 120 may determine a bandwidth part for the opportunistically converted resource based at least in part on identifying the opportunistically converted resource. For example, UE 120 may select a bandwidth part configured for an opportunistic slot to account for cross-border interference not being aligned with 100 Megahertz (MHz) and/or interference limitations on an opportunistically converted resource, which may differ from a cross-border interference alignment and/or interference limitation on a normal resource. In this case, BS 110 may configure UE 120 with one or more opportunistic uplink bandwidth parts (for opportunistically converted uplink resources) with a single one of the one or more opportunistic bandwidth parts being configured as active. Additionally, or alternatively, UE 120 may be configured with one or more opportunistic uplink bandwidth parts and downlink bandwidth parts for an opportunistically converted full-duplex resource. In this case, UE 120 may select the active opportunistic uplink and/or downlink bandwidth part for communication. Additionally, or alternatively, UE 120 may be configured with a set of bandwidth parts (e.g., that are not configured specifically for opportunistically converted resources) and may select a different bandwidth part, from a current bandwidth part, to use for the opportunistically converted resource. Alternatively, UE 120 may forgo changing a bandwidth part for an opportunistically converted resource.

In some aspects, UE 120 may determine a UL-CG configuration for the opportunistically converted resource. For example, UE 120 may determine a transmission power or modulation and coding scheme (MCS), among other examples for UL-CG transmission in an opportunistically converted resource. In some aspects, UE 120 may use separate configurations for UL-CG transmission in an opportunistically converted resource and a normal resource. Additionally, or alternatively, UE 120 may apply an offset, such as an offset to a transmission power value or an offset to an MCS index, to a configuration for UL-CG transmission in a normal resource to determine a configuration for UL-CG transmission in an opportunistically converted resource.

As further shown in FIG. 9, and by reference number 930, UE 120 and BS 110 may communicate on the opportunistically converted resource. For example, UE 120 may transmit or receive on the opportunistically converted resource in accordance with the one or more parameters determined for use in communication on the opportunistically converted resource.

As indicated above, FIG. 9 is provided as an example. Other examples may differ from what is described with respect to FIG. 9.

Figure 10:
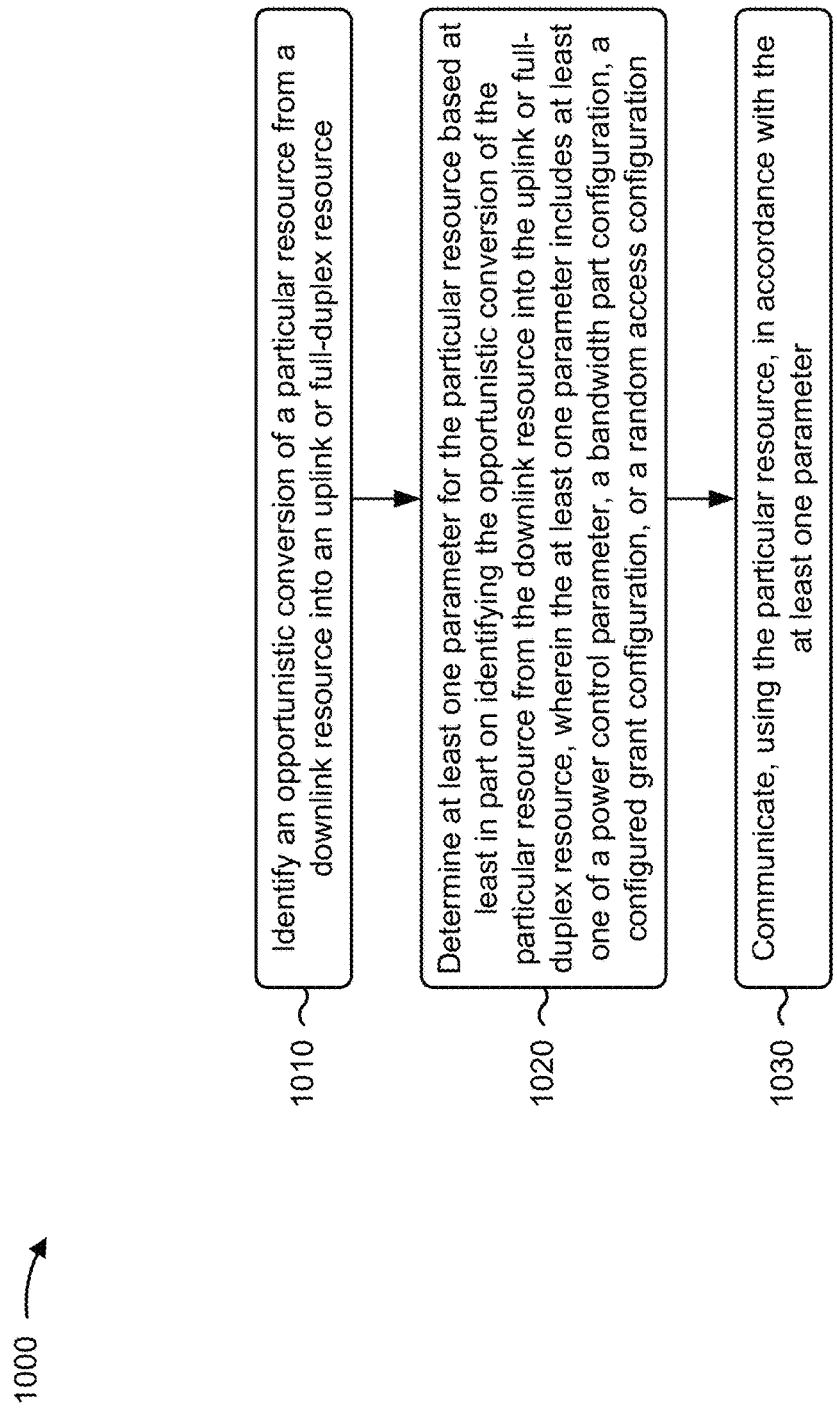
FIG. 10 is a diagram illustrating an example process associated with parameter control for opportunistically converted resources, in accordance with various aspects of the present disclosure.

FIG. 10 is a diagram illustrating an example process 1000 performed, for example, by a UE, in accordance with various aspects of the present disclosure. Example process 1000 is an example where the UE (e.g., UE 120) performs operations associated with parameter configuration for opportunistically converted resources.

As shown in FIG. 10, in some aspects, process 1000 may include identifying an opportunistic conversion of a particular resource from a downlink resource into an uplink or full-duplex resource (block 1010). For example, the UE (e.g., using identification component 1108, depicted in FIG. 11) may identify an opportunistic conversion of a particular resource from a downlink resource into an uplink or full-duplex resource, as described above.

As further shown in FIG. 10, in some aspects, process 1000 may include determining at least one parameter for the particular resource based at least in part on identifying the opportunistic conversion of the particular resource from the downlink resource into the uplink or full-duplex resource, wherein the at least one parameter includes at least one of a power control parameter, a bandwidth part configuration, a configured grant configuration, or a random access configuration (block 1020). For example, the UE (e.g., using determination component 1110, depicted in FIG. 11) may determine at least one parameter for the particular resource based at least in part on identifying the opportunistic conversion of the particular resource from the downlink resource into the uplink or full-duplex resource, wherein the at least one parameter includes at least one of a power control parameter, a bandwidth part configuration, a configured grant configuration, or a random access configuration, as described above.

As further shown in FIG. 10, in some aspects, process 1000 may include communicating, using the particular resource, in accordance with the at least one parameter (block 1030). For example, the UE (e.g., using reception component 1102 and/or transmission component 1104, depicted in FIG. 11) may communicate, using the particular resource, in accordance with the at least one parameter, as described above.

Process 1000 may include additional aspects, such as any single aspect or any combination of aspects described below and/or in connection with one or more other processes described elsewhere herein.

In a first aspect, process 1000 includes receiving a radio resource control indication of an opportunistic offset, and determining the power control parameter based at least in part on an uplink power control parameter and the opportunistic offset.

In a second aspect, alone or in combination with the first aspect, the opportunistic offset is based at least in part on a type of uplink communication that is transmitted in the particular resource or a type of the particular resource.

In a third aspect, alone or in combination with one or more of the first and second aspects, process 1000 includes receiving a transmit power control command including indication of an opportunistic offset, and determining the power control parameter based at least in part on an uplink power control parameter and the opportunistic offset.

In a fourth aspect, alone or in combination with one or more of the first through third aspects, process 1000 includes determining the power control parameter based at least in part on a set of stored values for opportunistically converted resources.

In a fifth aspect, alone or in combination with one or more of the first through fourth aspects, process 1000 includes determining the power control parameter based at least in part on a maximum power reduction parameter for opportunistically converted resources.

In a sixth aspect, alone or in combination with one or more of the first through fifth aspects, process 1000 includes determining the power control parameter based at least in part on a power headroom for the particular resource.

In a seventh aspect, alone or in combination with one or more of the first through sixth aspects, process 1000 includes determining an initial power value and a power ramping step size value for a random access procedure, and performing the random access procedure using the initial power value and the power ramping step size value.

In an eighth aspect, alone or in combination with one or more of the first through seventh aspects, process 1000 includes communicating using a different initial power value or a different power ramping step size value in a different resource that is not an opportunistically converted resource.

In a ninth aspect, alone or in combination with one or more of the first through eighth aspects, the particular resource is a slot or symbol.

In a tenth aspect, alone or in combination with one or more of the first through ninth aspects, process 1000 includes transmitting in accordance with the at least one parameter.

In an eleventh aspect, alone or in combination with one or more of the first through tenth aspects, process 1000 includes selecting an active configured opportunistic bandwidth part for use in the particular resource.

In a twelfth aspect, alone or in combination with one or more of the first through eleventh aspects, process 1000 includes selecting a currently active bandwidth part for use in the particular resource.

In a thirteenth aspect, alone or in combination with one or more of the first through twelfth aspects, process 1000 includes selecting an uplink bandwidth part, from a set of up to a threshold quantity of configured uplink bandwidth parts, for use in the particular resource.

In a fourteenth aspect, alone or in combination with one or more of the first through thirteenth aspects, process 1000 includes receiving, in a connected mode or via a system information block message, information identifying a set of physical random access channel preambles for use in an opportunistically converted resource, and selecting at least one of the set of physical random access channel preambles for use in the particular resource.

In a fifteenth aspect, alone or in combination with one or more of the first through fourteenth aspects, the at least one parameter includes a configuration of a received target power or power ramping step for use in the particular resource.

In a sixteenth aspect, alone or in combination with one or more of the first through fifteenth aspects, the at least one parameter includes at least one of whether a configured grant is enabled for the particular resource, a transmission power for the particular resource, a modulation and coding scheme for the particular resource, or a configured grant transmission power parameter for the particular resource.

In a seventeenth aspect, alone or in combination with one or more of the first through sixteenth aspects, process 1000 includes continuing communicating in accordance with the at least one parameter for a non-opportunistically converted uplink resource occurring after the particular resource.

In an eighteenth aspect, alone or in combination with one or more of the first through seventeenth aspects, process 1000 includes returning to a default set of parameters that is different from the at least one parameter for a non-opportunistically converted uplink resource occurring after the particular resource, and communicating in accordance with the default set of parameters in the non-opportunistically converted uplink resource.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
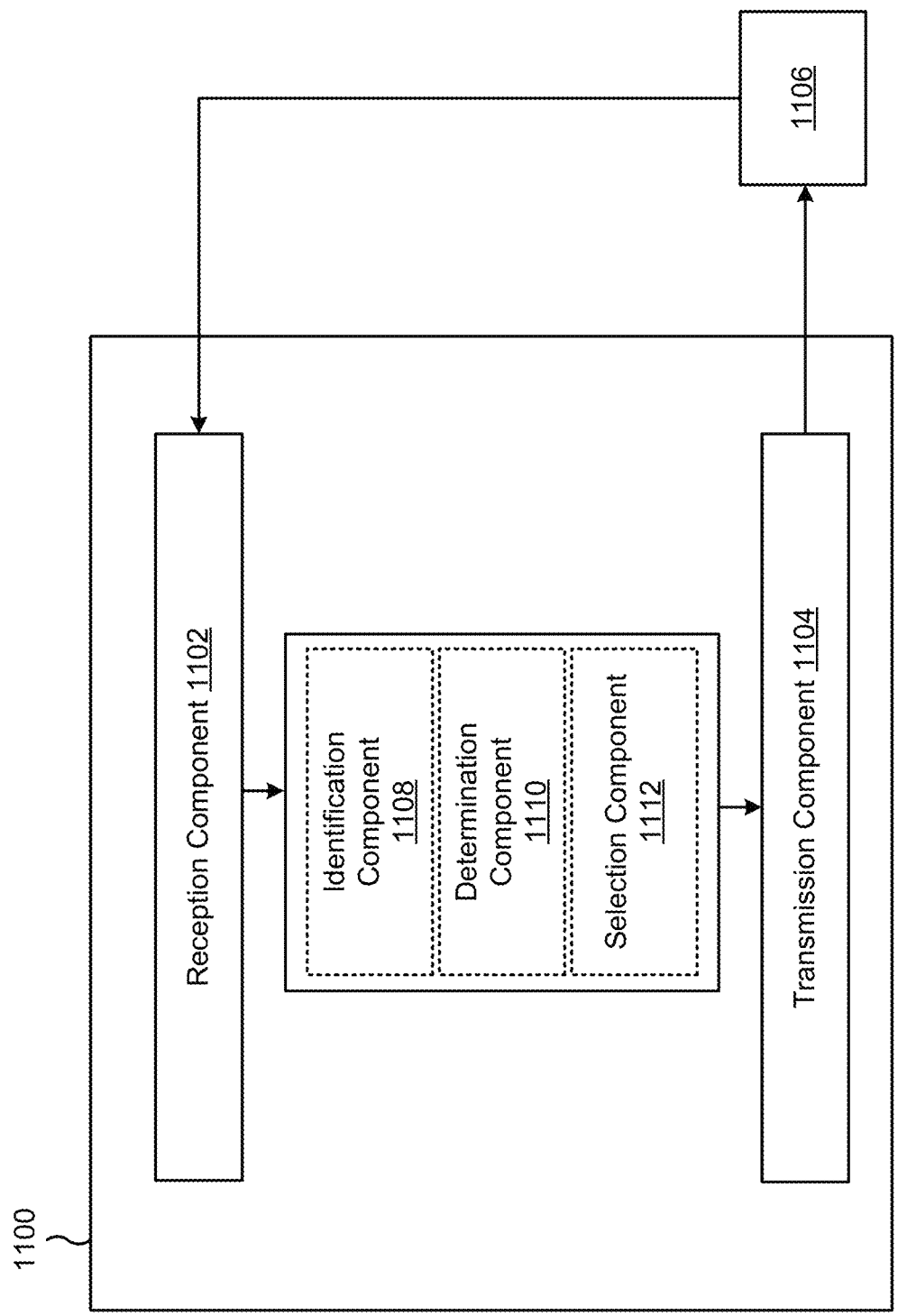
FIGS. 11-12 are block diagrams of example apparatuses for wireless communication, in accordance with various aspects of the present disclosure.

FIG. 11 is a block diagram of an example apparatus 1100 for wireless communication. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include one or more of an identification component 1108, a determination component 1110, or a selection component 1112, among other examples.

In some aspects, the apparatus 1100 may be configured to perform one or more operations described herein in connection with FIG. 9. Additionally, or alternatively, the apparatus 1100 may be configured to perform one or more processes described herein, such as process 1000 of FIG. 10. In some aspects, the apparatus 1100 and/or one or more components shown in FIG. 11 may include one or more components of the UE described above in connection with FIG. 2. Additionally, or alternatively, one or more components shown in FIG. 11 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a demodulator, a MIMO detector, a receive processor, a controller/processor, a memory, or a combination thereof, of the UE described above in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the UE described above in connection with FIG. 2. In some aspects, the transmission component 1104 may be co-located with the reception component 1102 in a transceiver.

The identification component 1108 may identify an opportunistic conversion of a particular resource from a downlink resource into an uplink or full-duplex resource. The determination component 1110 may determine at least one parameter for the particular resource based at least in part on identifying the opportunistic conversion of the particular resource from the downlink resource into the uplink or full-duplex resource, wherein the at least one parameter includes at least one of a power control parameter, a bandwidth part configuration, a configured grant configuration, or a random access configuration. The reception component 1102 and/or the transmission component 1104 may communicate, using the particular resource, in accordance with the at least one parameter.

The reception component 1102 may receive a radio resource control indication of an opportunistic offset.

The reception component 1102 may receive a transmit power control command including indication of an opportunistic offset.

The reception component 1102 and/or the transmission component 1104 may communicate using a different initial power value or a different power ramping step size value in a different resource that is not an opportunistically converted resource.

The reception component 1102 may receive, in a connected mode or via a system information block message, information identifying a set of physical random access channel preambles for use in an opportunistically converted resource.

The reception component 1102 and/or the transmission component 1104 may continue communicating in accordance with the at least one parameter for a non-opportunistically converted uplink resource occurring after the particular resource.

The determination component 1110 may return to a default set of parameters that is different from the at least one parameter for a non-opportunistically converted uplink resource occurring after the particular resource.

The reception component 1102 and/or the transmission component 1104 may communicate in accordance with the default set of parameters in the non-opportunistically converted uplink resource.

The selection component 1112 may select one or more parameters, such as a bandwidth part, to use for an opportunistically converted resource.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
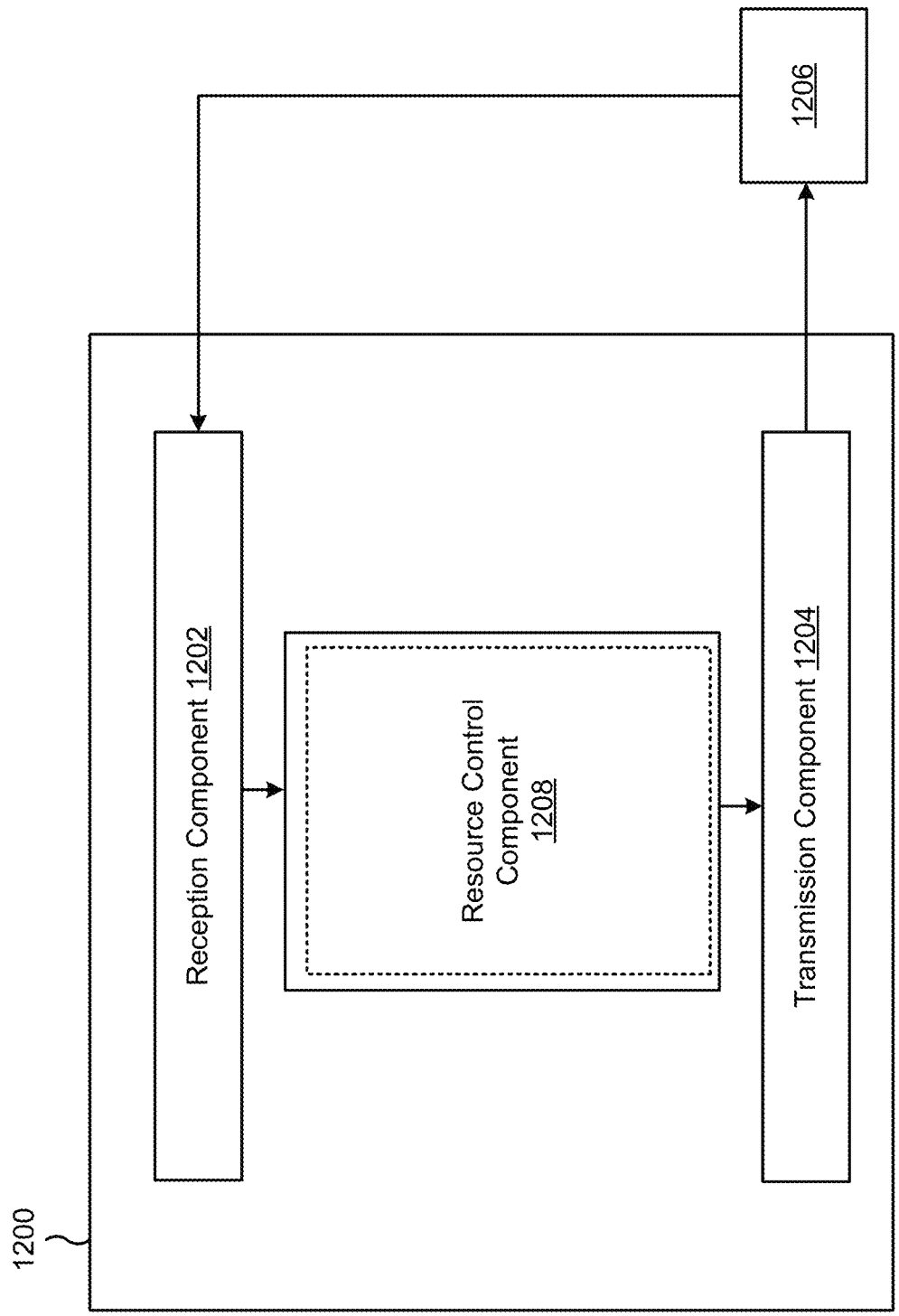

FIG. 12 is a block diagram of an example apparatus 1200 for wireless communication. The apparatus 1200 may be a BS, or a BS may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include one or more of a resource control component 1208, among other examples.

In some aspects, the apparatus 1200 may be configured to perform one or more operations described herein in connection with FIG. 9. Additionally, or alternatively, the apparatus 1200 may be configured to perform one or more processes described herein. In some aspects, the apparatus 1200 and/or one or more components shown in FIG. 12 may include one or more components of the BS described above in connection with FIG. 2. Additionally, or alternatively, one or more components shown in FIG. 12 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1206. In some aspects, the reception component 1202 may include one or more antennas, a demodulator, a MIMO detector, a receive processor, a controller/processor, a memory, or a combination thereof, of the BS described above in connection with FIG. 2.

The transmission component 1204 may transmit communications, such as reference signals, control information, data communications, or a combination thereof, to the apparatus 1206. In some aspects, one or more other components of the apparatus 1206 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modulator, a transmit MIMO processor, a transmit processor, a controller/processor, a memory, or a combination thereof, of the BS described above in connection with FIG. 2. In some aspects, the transmission component 1204 may be co-located with the reception component 1202 in a transceiver.

The resource control component 1208 may identify a resource for opportunistic conversion, opportunistically convert the identified resource, and cause the transmission component 1204 to transmit a notification of the opportunistic conversion of the identified resource to the apparatus 1206.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some aspects of the present disclosure:

Aspect 1: A method of wireless communication performed by a user equipment (UE), comprising: identifying an opportunistic conversion of a particular resource from a downlink resource into an uplink or full-duplex resource; and determining at least one parameter for the particular resource based at least in part on identifying the opportunistic conversion of the particular resource from the downlink resource into the uplink or full-duplex resource, wherein the at least one parameter includes at least one of a power control parameter, a bandwidth part configuration, a configured grant configuration, or a random access configuration; and communicating, using the particular resource, in accordance with the at least one parameter.

Aspect 2: The method of aspect 1, further comprising: receiving a radio resource control indication of an opportunistic offset; and wherein determining the at least one parameter comprises: determining the power control parameter based at least in part on an uplink power control parameter and the opportunistic offset.

Aspect 3: The method of aspect 2, wherein the opportunistic offset is based at least in part on a type of uplink communication that is transmitted in the particular resource or a type of the particular resource.

Aspect 4: The method of any of aspects 1 to 3, further comprising: receiving a transmit power control command including indication of an opportunistic offset; and wherein determining the at least one parameter comprises: determining the power control parameter based at least in part on an uplink power control parameter and the opportunistic offset.

Aspect 5: The method of any of aspects 1 to 4, wherein determining the at least one parameter comprises: determining the power control parameter based at least in part on a set of stored values for opportunistically converted resources.

Aspect 6: The method of any of aspects 1 to 5, wherein determining the at least one parameter comprises: determining the power control parameter based at least in part on a maximum power reduction parameter for opportunistically converted resources.

Aspect 7: The method of any of aspects 1 to 6, wherein determining the at least one parameter comprises: determining the power control parameter based at least in part on a power headroom for the particular resource.

Aspect 8: The method of any of aspects 1 to 7, wherein determining the at least one parameter comprises: determining an initial power value and a power ramping step size value for a random access procedure; and wherein communicating in accordance with the at least one parameter comprises: performing the random access procedure using the initial power value and the power ramping step size value.

Aspect 9: The method of aspect 8, further comprising: communicating using a different initial power value or a different power ramping step size value in a different resource that is not an opportunistically converted resource.

Aspect 10: The method of any of aspects 1 to 9, wherein the particular resource is a slot or symbol.

Aspect 11: The method of any of aspects 1 to 10, wherein communicating in accordance with the at least one parameter comprises: transmitting in accordance with the at least one parameter.

Aspect 12: The method of any of aspects 1 to 11, wherein determining the at least one parameter comprises: selecting an active configured opportunistic bandwidth part for use in the particular resource.

Aspect 13: The method of any of aspects 1 to 12, wherein determining the at least one parameter comprises: selecting a currently active bandwidth part for use in the particular resource.

Aspect 14: The method of any of aspects 1 to 13, wherein determining the at least one parameter comprises: selecting an uplink bandwidth part, from a set of up to a threshold quantity of configured uplink bandwidth parts, for use in the particular resource.

Aspect 15: The method of any of aspects 1 to 14, further comprising: receiving, in a connected mode or via a system information block message, information identifying a set of physical random access channel preambles for use in an opportunistically converted resource; and wherein determining the at least one parameter comprises: selecting at least one of the set of physical random access channel preambles for use in the particular resource.

Aspect 16: The method of any of aspects 1 to 15, wherein the at least one parameter includes a configuration of a received target power or power ramping step for use in the particular resource.

Aspect 17: The method of any of aspects 1 to 16, wherein the at least one parameter includes at least one of: whether a configured grant is enabled for the particular resource, a transmission power for the particular resource, a modulation and coding scheme for the particular resource, or a configured grant transmission power parameter for the particular resource.

Aspect 18: The method of any of aspects 1 to 17, further comprising: continuing communicating in accordance with the at least one parameter for a non-opportunistically converted uplink resource occurring after the particular resource.

Aspect 19: The method of any of aspects 1 to 18, further comprising: returning to a default set of parameters that is different from the at least one parameter for a non-opportunistically converted uplink resource occurring after the particular resource; and communicating in accordance with the default set of parameters in the non-opportunistically converted uplink resource.

Aspect 20: An apparatus for wireless communication at a device, comprising a processor; memory coupled with the processor; and instructions stored in the memory and executable by the processor to cause the apparatus to perform the method of one or more aspects of aspects 1-19.

Aspect 21: A device for wireless communication, comprising a memory and one or more processors coupled to the memory, the memory and the one or more processors configured to perform the method of one or more aspects of aspects 1-19.

Aspect 22: An apparatus for wireless communication, comprising at least one means for performing the method of one or more aspects of aspects 1-19.

Aspect 23: A non-transitory computer-readable medium storing code for wireless communication, the code comprising instructions executable by a processor to perform the method of one or more aspects of aspects 1-19.

Aspect 24: A non-transitory computer-readable medium storing a set of instructions for wireless communication, the set of instructions comprising one or more instructions that, when executed by one or more processors of a device, cause the device to perform the method of one or more aspects of aspects 1-19.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has,"

"have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
a memory; and
one or more processors operatively coupled to the memory, the memory and the one or more processors configured to:
identify an opportunistic conversion of a particular resource from a downlink resource into an uplink or full-duplex resource; and
determine at least one parameter for the particular resource based at least in part on identifying the opportunistic conversion of the particular resource from the downlink resource into the uplink or full-duplex resource, wherein the at least one parameter includes at least one of a power control parameter, a bandwidth part configuration, a configured grant configuration, or a random access configuration; and
communicate, using the particular resource, in accordance with the at least one parameter.

2. The UE of claim 1, wherein the one or more processors are further configured to:
receive a radio resource control indication of an opportunistic offset; and
wherein the one or more processors, when determining the at least one parameter, are configured to:
determine the power control parameter based at least in part on an uplink power control parameter and the opportunistic offset.

3. The UE of claim 2, wherein the opportunistic offset is based at least in part on a type of uplink communication that is transmitted in the particular resource or a type of the particular resource.

4. The UE of claim 1, wherein the one or more processors are further configured to:
receive a transmit power control command including indication of an opportunistic offset; and
wherein the one or more processors, when determining the at least one parameter, are configured to:
determine the power control parameter based at least in part on an uplink power control parameter and the opportunistic offset.

5. The UE of claim 1, wherein the one or more processors, when determining the at least one parameter, are configured to:
determine the power control parameter based at least in part on a set of stored values for opportunistically converted resources.

6. The UE of claim 1, wherein the one or more processors, when determining the at least one parameter, are configured to:
determine the power control parameter based at least in part on a maximum power reduction parameter for opportunistically converted resources.

7. The UE of claim 1, wherein the one or more processors, when determining the at least one parameter, are configured to:
determine the power control parameter based at least in part on a power headroom for the particular resource.

8. The UE of claim 1, wherein the one or more processors, when determining the at least one parameter, are configured to:
determine an initial power value and a power ramping step size value for a random access procedure; and
wherein the one or more processors, when communicating in accordance with the at least one parameter, are configured to:
perform the random access procedure using the initial power value and the power ramping step size value.

9. The UE of claim 8, wherein the one or more processors are further configured to:
communicate using a different initial power value or a different power ramping step size value in a different resource that is not an opportunistically converted resource.

10. The UE of claim 1, wherein the particular resource is a slot or symbol.

11. The UE of claim 1, wherein the one or more processors, when communicating in accordance with the at least one parameter, are configured to:
transmit in accordance with the at least one parameter.

12. The UE of claim 1, wherein the one or more processors, when determining the at least one parameter, are configured to:
select an active configured opportunistic bandwidth part for use in the particular resource.

13. The UE of claim 1, wherein the one or more processors, when determining the at least one parameter, are configured to:
select a currently active bandwidth part for use in the particular resource.

14. The UE of claim 1, wherein the one or more processors, when determining the at least one parameter, are configured to:
select an uplink bandwidth part, from a set of up to a threshold quantity of configured uplink bandwidth parts, for use in the particular resource.

15. The UE of claim 1, wherein the one or more processors are further configured to:
receive, in a connected mode or via a system information block message, information identifying a set of physical random access channel preambles for use in an opportunistically converted resource; and
wherein the one or more processors, when determining the at least one parameter, are configured to:
select at least one of the set of physical random access channel preambles for use in the particular resource.

16. The UE of claim 1, wherein the at least one parameter includes a configuration of a received target power or power ramping step for use in the particular resource.

17. The UE of claim 1, wherein the at least one parameter includes at least one of:
whether a configured grant is enabled for the particular resource,
a transmission power for the particular resource,
a modulation and coding scheme for the particular resource, or
a configured grant transmission power parameter for the particular resource.

18. The UE of claim 1, wherein the one or more processors are further to:
continue communicating in accordance with the at least one parameter for a non-opportunistically converted uplink resource occurring after the particular resource.

19. The UE of claim 1, wherein the one or more processors are further to:

returning to a default set of parameters that is different from the at least one parameter for a non-opportunistically converted uplink resource occurring after the particular resource; and communicating in accordance with the default set of parameters in the non-opportunistically converted uplink resource.

20. A method of wireless communication performed by a user equipment (UE), comprising:

identifying an opportunistic conversion of a particular resource from a downlink resource into an uplink or full-duplex resource; and determining at least one parameter for the particular resource based at least in part on identifying the opportunistic conversion of the particular resource from the downlink resource into the uplink or full-duplex resource, wherein the at least one parameter includes at least one of a power control parameter, a bandwidth part configuration, a configured grant configuration, or a random access configuration; and communicating, using the particular resource, in accordance with the at least one parameter.

21. The method of claim 20, further comprising:

receiving a radio resource control indication of an opportunistic offset; and wherein determining the at least one parameter comprises:
determining the power control parameter based at least in part on an uplink power control parameter and the opportunistic offset.

22. The method of claim 21, wherein the opportunistic offset is based at least in part on a type of uplink communication that is transmitted in the particular resource or a type of the particular resource.

23. The method of claim 20, further comprising:

receiving a transmit power control command including indication of an opportunistic offset; and wherein determining the at least one parameter comprises:
determining the power control parameter based at least in part on an uplink power control parameter and the opportunistic offset.

24. The method of claim 20, wherein determining the at least one parameter comprises:

determining the power control parameter based at least in part on a set of stored values for opportunistically converted resources.

25. The method of claim 20, wherein determining the at least one parameter comprises:

determining the power control parameter based at least in part on a maximum power reduction parameter for opportunistically converted resources.

26. The method of claim 20, wherein determining the at least one parameter comprises:
determining the power control parameter based at least in part on a power headroom for the particular resource.

27. The method of claim 20, wherein determining the at least one parameter comprises:

determining an initial power value and a power ramping step size value for a random access procedure; and wherein communicating in accordance with the at least one parameter comprises:
performing the random access procedure using the initial power value and the power ramping step size value.

28. The method of claim 27, further comprising:

communicating using a different initial power value or a different power ramping step size value in a different resource that is not an opportunistically converted resource.

29. A non-transitory computer-readable medium storing a set of instructions for wireless communication, the set of instructions comprising:

one or more instructions that, when executed by one or more processors of a user equipment (UE), cause the UE to:

identify an opportunistic conversion of a particular resource from a downlink resource into an uplink or full-duplex resource; and determine at least one parameter for the particular resource based at least in part on identifying the opportunistic conversion of the particular resource from the downlink resource into the uplink or full-duplex resource, wherein the at least one parameter includes at least one of a power control parameter, a bandwidth part configuration, a configured grant configuration, or a random access configuration; and communicate, using the particular resource, in accordance with the at least one parameter.

30. An apparatus for wireless communication, comprising:

means for identifying an opportunistic conversion of a particular resource from a downlink resource into an uplink or full-duplex resource; and means for determining at least one parameter for the particular resource based at least in part on identifying the opportunistic conversion of the particular resource from the downlink resource into the uplink or full-duplex resource, wherein the at least one parameter includes at least one of a power control parameter, a bandwidth part configuration, a configured grant configuration, or a random access configuration; and means for communicating, using the particular resource, in accordance with the at least one parameter.

* * * * *